United States Patent
Hough

(10) Patent No.: US 9,216,803 B2
(45) Date of Patent: *Dec. 22, 2015

(54) PROTECTIVE APPARATUS FOR MARINE STRUCTURES

(71) Applicant: Jonathan B. Hough, Houston, TX (US)

(72) Inventor: Jonathan B. Hough, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/255,062

(22) Filed: Apr. 17, 2014

(65) Prior Publication Data

US 2014/0311395 A1  Oct. 23, 2014

Related U.S. Application Data

(63) Continuation of application No. 13/377,594, filed as application No. PCT/US2010/038505 on Jun. 14, 2010, now Pat. No. 8,721,224.

(60) Provisional application No. 61/186,743, filed on Jun. 12, 2009, provisional application No. 61/239,601, filed on Sep. 3, 2009.

(51) Int. Cl.
*E02B 3/26* (2006.01)
*B63B 59/02* (2006.01)

(52) U.S. Cl.
CPC . *B63B 59/02* (2013.01); *E02B 3/26* (2013.01); *B63B 2059/025* (2013.01); *Y10T 29/49826* (2015.01)

(58) Field of Classification Search
CPC .................................. E02B 3/26; E02B 3/28
USPC .................................................. 405/212, 215
See application file for complete search history.

(56) References Cited

U.S. PATENT DOCUMENTS

| | | | |
|---|---|---|---|
| 2,959,146 A | | 11/1960 | Erkert |
| 3,014,710 A | * | 12/1961 | Layne ........................... 405/215 |
| 3,306,053 A | | 2/1967 | Fulton |
| 3,593,531 A | * | 7/1971 | Saadeh et al. ................. 405/212 |
| 3,608,882 A | | 9/1971 | Culp |
| 3,828,715 A | | 8/1974 | Matsushita |
| 3,902,748 A | | 9/1975 | Bank et al. |
| 4,055,136 A | | 10/1977 | Fujisawa et al. |
| 4,084,533 A | | 4/1978 | Boyer |

(Continued)

FOREIGN PATENT DOCUMENTS

| | | |
|---|---|---|
| GB | 525017 A | 8/1940 |
| GB | 532304 | 1/1941 |

(Continued)

*Primary Examiner* — Frederick L Lagman
(74) *Attorney, Agent, or Firm* — McGlinchey Stafford, PLLC; R. Andrew Patty, II

(57) ABSTRACT

An apparatus for inhibiting damage from impact between a marine structure and an adjacent watercraft, and a related method, are described. The apparatus includes a cushion body forming a mounting surface and a watercraft-engaging surface substantially opposing the mounting surface, at least one rigid support member, the rigid support member defined by or configured for contact with the mounting surface of the cushion body and disposed, during use, between the cushion body and the portion of the marine structure, and attachment means for detachably attaching the cushion body to the portion of the marine structure. The cushion body, when attached to the portion of the marine structure, is sized and configured to prevent destructive contact between the marine structure and a watercraft when the watercraft-engaging surface is contacted by the watercraft.

9 Claims, 7 Drawing Sheets

(56) References Cited

U.S. PATENT DOCUMENTS

| | | |
|---|---|---|
| 4,143,612 A | 3/1979 | Ticknor |
| 4,920,907 A * | 5/1990 | Richter .................. 114/219 |
| 4,924,796 A | 5/1990 | Duffy |
| 4,964,760 A | 10/1990 | Hartman |
| 4,968,182 A | 11/1990 | Westwell |
| 4,970,980 A * | 11/1990 | Eisner .................. 114/219 |
| 5,007,609 A | 4/1991 | Bredovskis |
| 5,013,272 A | 5/1991 | Watkins |
| 5,018,471 A | 5/1991 | Stevens |
| 5,562,364 A | 10/1996 | Darder-Alomar |
| 5,832,857 A | 11/1998 | McPherson |
| 6,021,729 A | 2/2000 | DeRuscio |
| 6,053,664 A | 4/2000 | Crane et al. |
| 6,289,836 B1 | 9/2001 | Tellex |
| 6,402,187 B1 | 6/2002 | Gilpatrick et al. |
| 6,470,818 B1 | 10/2002 | Mears et al. |
| 6,477,973 B1 | 11/2002 | Kobas |
| 6,685,395 B1 | 2/2004 | Busby |
| 6,758,156 B1 | 7/2004 | Kobas |
| 6,814,019 B2 | 11/2004 | Mears et al. |
| 6,823,811 B1 | 11/2004 | Drake |
| 6,832,570 B2 | 12/2004 | Aschenbach |
| 6,863,009 B1 | 3/2005 | Driver |
| 6,951,181 B1 | 10/2005 | Lemke |
| D511,723 S | 11/2005 | Kobas |
| 6,983,711 B1 | 1/2006 | Lemke |
| 7,036,448 B1 | 5/2006 | Holmes |
| 7,143,714 B1 | 12/2006 | Schmidt |
| 7,469,923 B2 | 12/2008 | Ryan et al. |
| 7,506,601 B2 | 3/2009 | Adams |
| 7,509,920 B2 | 3/2009 | Taylor |
| 7,527,454 B1 | 5/2009 | Brushaber |
| 8,721,224 B2 * | 5/2014 | Hough .................. 405/215 |
| 2004/0221788 A1 | 11/2004 | Sievewright |
| 2008/0000409 A1 | 1/2008 | Adams |
| 2008/0083364 A1 | 4/2008 | Taylor |
| 2010/0166502 A1 | 7/2010 | DeMay |
| 2012/0003050 A1 * | 1/2012 | DeMay .................. 405/215 |

FOREIGN PATENT DOCUMENTS

| | | |
|---|---|---|
| GB | 673754 | 6/1952 |
| JP | 51-097197 A | 8/1976 |
| JP | 51-160395 U | 12/1976 |
| JP | 55031640 A | 3/1980 |
| JP | 2003-041553 A | 2/2003 |
| WO | WO 8702438 A1 | 4/1987 |
| WO | WO 9419233 A1 | 9/1994 |
| WO | WO 0126959 A1 | 4/2001 |
| WO | WO 2008010731 A1 | 1/2008 |

* cited by examiner

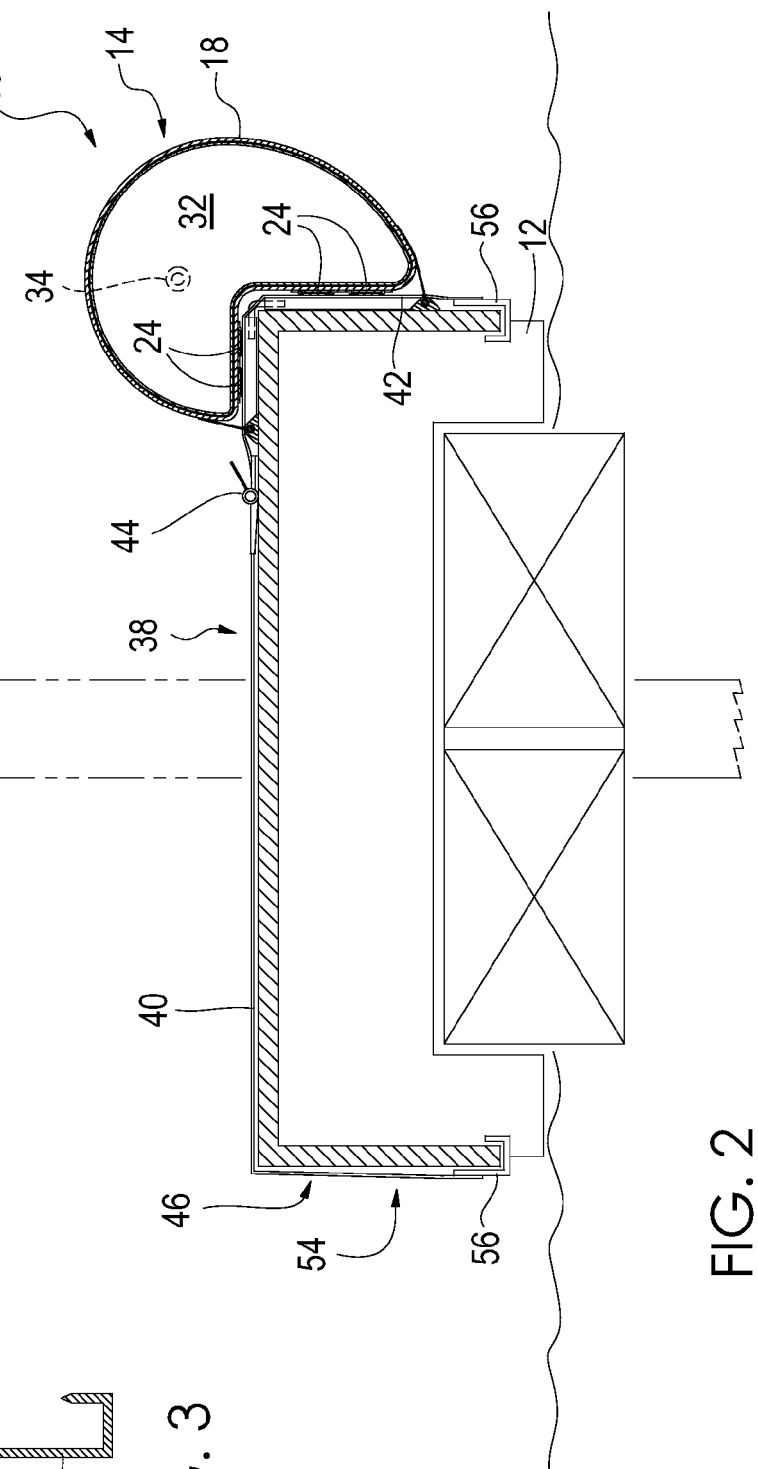
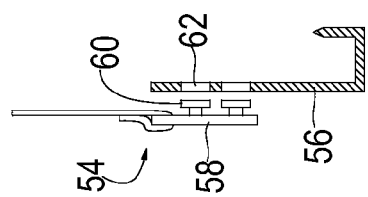
FIG. 2
FIG. 3

PROTECTIVE APPARATUS FOR MARINE STRUCTURES

REFERENCE TO RELATED APPLICATIONS

This application is a continuation of commonly owned and U.S. application Ser. No. 13/377,594, filed Dec. 12, 2011, now U.S. Pat. No. 8,721,224 which is the National Stage of PCT International Patent Application PCT/US2010/038505, filed on Jun. 14, 2010, which claims the benefit of prior U.S. Provisional Application Nos. 61/186,743 and 61/239,601 with filing dates of Jun. 12, 2009 and Sep. 3, 2009, respectively, the disclosure of which is incorporated herein by reference.

TECHNICAL FIELD

This invention relates to a detachable apparatus for protection of watercraft and adjacent marine structures and, more particularly, to protective bumpers for temporary attachment to docks, piers, pilings, wharfs, and the like.

BACKGROUND

Due to the unstable nature of watercraft, particularly in rough waters caused by strong winds and/or wakes of passing watercraft, costly damage may result when a watercraft's hull directly impacts the fixed or floating marine structure to which it is docking or moored. One approach known in the art to solve this problem is to incorporate fenders, including rub rails, rub guards and bumpers, on the watercraft to prevent damage caused by impact between the watercraft and the marine structure. Another known approach used by docked watercraft for the purpose of cushioning a potential impact with a marine structure is the use of suspended bumpers consisting of molded, air or foam filled chambers (most commonly constructed of marine grade vinyl/polyvinyl chloride (PVC)) suspended vertically by a rope secured by one end to the hull or other fixed element (often a cleat, winch, rail or stanchion).

However, the use of known fenders and suspended bumpers may fail to prevent damage to the watercraft and/or marine structure when weather conditions cause wave heights, immediately adjacent to the docked watercraft, to exceed a certain height, e.g., 6 inches. When marine weather conditions cause wave heights, immediately adjacent to a docked watercraft, to exceed 6 inches, associated wave action enhances the inherently unstable position of the watercraft and often causes the boat to pitch forward and aft about a latitudinal axis of the boat and/or to roll from side to side about a longitudinal axis of the boat, perpendicular to the latitudinal axis. As the watercraft rises up, the associated roll or pitching motion often causes current fenders/bumpers to become dislodged from the position desired, significantly limiting suspended bumpers' ability to both cushion and maintain separation between the dock or other marine structure and watercraft. When this occurs, opportunities for direct impact and costly damage result.

Another approach known in the art to minimize or stem potential hull damage to vessels encountering rough waters caused by strong winds and or wakes of passing watercraft is to incorporate permanently affixed cushioning bodies comprised of compression resistant materials (spare tires, carpet, fire hose materials, molded polyvinyl chloride, etc.) to the marine structure, e.g., dock. These devices require frequent replacement and penetrating mechanical fasteners for attachment (lag screws, bolts or nails) which, in addition to the cushioning materials, can also mar the watercraft's hull. Other similar cushioning devices, also permanently attached to marine structures, have been developed from foam and/or air filled vinyl chambers. However, the approach has failed in instances where some of these products have lost their resilience and hardened over time and require removal or replacement. Molded polyvinyl chloride and vinyl materials are known to harden overtime as a result of constant exposure to direct sunlight. Furthermore, in some circumstances, these penetrating mechanical fasteners may damage the dock and/or may not be desirable to the dock owner.

SUMMARY OF THE INVENTION

Thus, a need exists for an apparatus and/or method to provide protection for a watercraft and/or a marine structure from costly damage to the watercraft and/or the marine structure during rough waters caused by, for example, storms or the passing wake of other watercraft. It would be advantageous if the apparatus could be quickly and efficiently attached to the marine structure and removed from the marine structure without significantly modifying the surface and/or causing permanent damage to the marine structure. In at least one aspect, this invention provides for a detachable attachment of a cushion body capable of protecting watercraft and/or marine structures from damage in rough waters without permanently altering the surface of the marine structure or requiring extensive labor to attach or remove the inflatable body. The cushion body may be attached quickly and efficiently, which is advantageous in conditions wherein rough water may be caused by a rapidly approaching storm. Additionally, the detachable attachment may be temporary to allow for its removal so the marine structure may be uninhibited when rough waters subside.

Another embodiment of this invention is an apparatus for detachable attachment to a portion of a marine structure. The apparatus comprises a cushion body forming a mounting surface and a watercraft-engaging surface substantially opposing the mounting surface;

at least one rigid support member, the rigid support member defined by or configured for contact with the mounting surface of the cushion body and disposed, during use, between the cushion body and the portion of the marine structure; and attachment means for detachably attaching the cushion body to the portion of the marine structure, wherein the cushion body, when attached to the portion of the marine structure, is sized and configured to prevent destructive contact between the marine structure and a watercraft when the watercraft-engaging surface is contacted by the watercraft. In some aspects of the invention, the apparatus includes either an inflatable body, or a solid or semi-solid body of a resilient material (e.g., polymer foam such as ethylene-vinyl acetate or the like), forming a mounting surface and a watercraft-engaging surface opposing the mounting surface. In some aspects of the invention, the mounting surface of the inflatable body, if employed, is structurally reinforced or formed from rigid material to better secure the inflatable body to the marine structure during use. In another aspect, such reinforcement may be provided by a plurality of mounting surface support members, each inserted into a respective channel of a plurality of channels defined by or connected to the mounting surface. The inflatable body, when detachably attached to the portion of the marine structure and inflated, is sized and configured to prevent damage to either the marine structure or a watercraft when the watercraft-engaging surface is contacted by the watercraft.

Another embodiment of this invention is a method for preventing damage to a watercraft or a marine structure. The method comprises disposing a cushion body forming a mounting surface and a watercraft-engaging surface substantially opposing the mounting surface proximate a receiving surface of the marine structure;

disposing at least one rigid support member between the cushion body and the marine structure;

detachably attaching the rigid member to the inflatable body and to the marine structure.

These and other aspects and features of this invention will be still further apparent from the ensuing description, accompanying drawings and appended claims.

BRIEF DESCRIPTION OF THE DRAWINGS

FIG. 2 is a side and partial cross-sectional view of one of the inflatable bodies of FIG. 1 and mounting frame temporarily attached to the floating dock.

FIG. 3 is a magnified view of a bracket, illustrated as a J-bracket, used to temporarily attach the inflatable body of FIG. 1 to the floating dock.

FIG. 9 is a magnified cross-sectional view of a foam core cushion body in another embodiment of this invention, taken in the same plane as that of FIG. 5 and further illustrating the foam board support of FIG. 8 in the cross-sectional view.

In each of the above figures, like numerals are used to refer to like or functionally like parts amongst the several figures.

FURTHER DETAILED DESCRIPTION OF THE INVENTION

Figure 1:
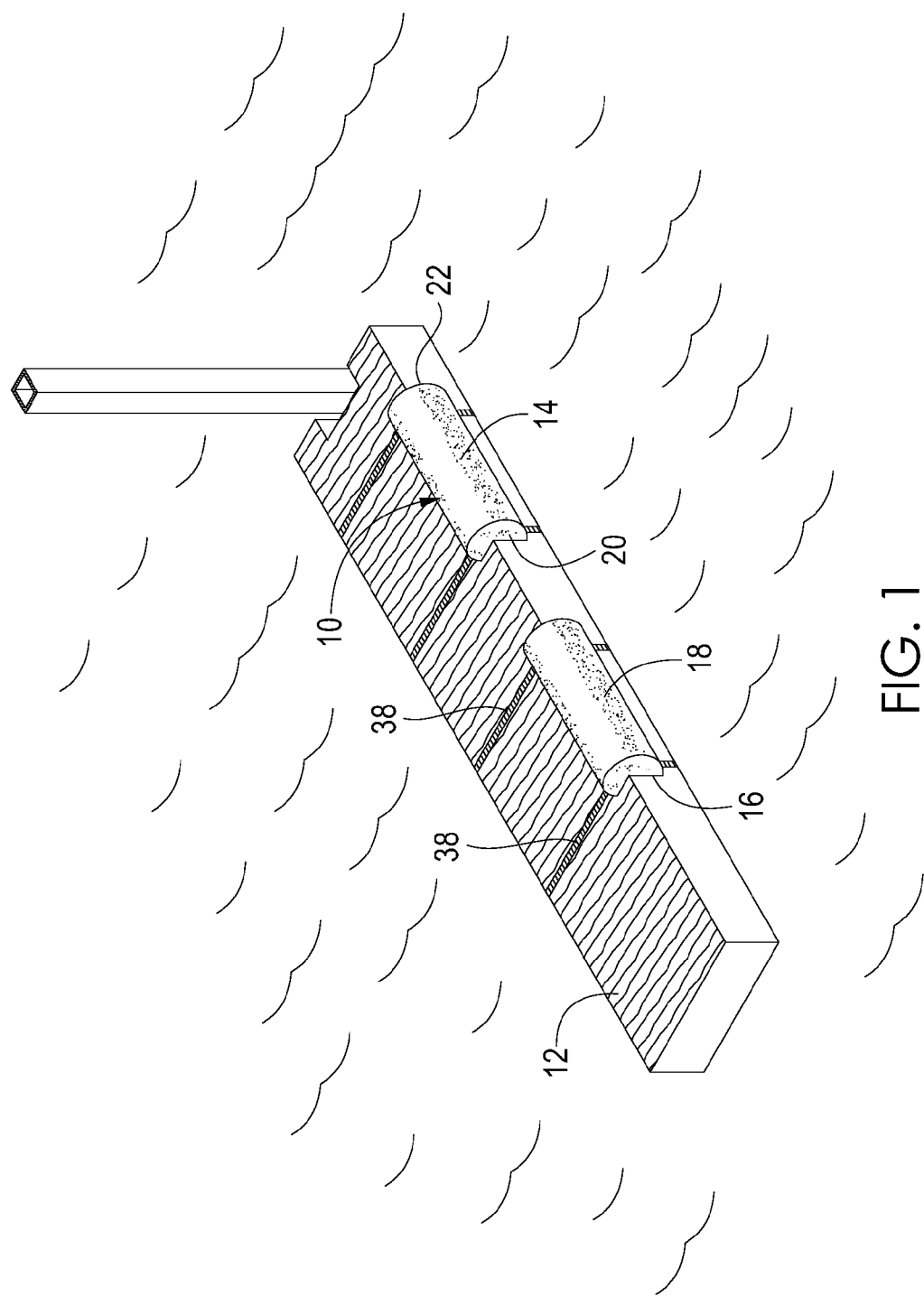
FIG. 1 is a perspective view of two cushion bodies, in this case inflatable bodies, temporarily attached to a floating dock consistent with one embodiment of the present invention.

It should now be appreciated that, unlike the previously known devices and methods, particular embodiments of this invention enable the facile installation and, if desired, removal of, a sturdy and effective protective barrier between a marine structure and an adjacent watercraft. Such a system is particularly desirable during conditions of rough waters surrounding the marine structure and watercraft, when damage to the structure and/or adjacent watercraft is most likely. The components of apparatus of the invention are easily assembled and installed, while also easily disassembled for compact storage when not in use.

The cushion body component in apparatus of the invention may be any structure which provides a cushion between the marine structure and the watercraft. In certain aspects of the invention, however, the cushion body is either an inflatable body or a foam core body. The inflatable body may be a single bladder-type structure fabricated from a nonporous, substantially airtight material, e.g., a rubber or plastic material, or a multi-layer system having an inner bladder for containing pressurized fluid (e.g., air) made of like nonporous, substantially airtight material and an outer cover layer of abrasion and impact resistant material (e.g., a urethane-coated fabric).

If a solid or semi-solid cushion body is employed, the cushion body may be formed from a wide variety of solid or semi-solid (e.g., cured foam), resilient materials, but in certain aspects of the invention is preferably fabricated from a polymer foam such as, e.g., ethyl-vinyl acetate. The foam cushion body, when employed, may further be covered by an abrasion and impact-resistant cover material such as, e.g., a polyurethane fabric. Foam cushion bodies employed in apparatus of the invention may further comprise a coating on at least the two end surfaces, or all surfaces, of the foam, the coating being an impact-resistant material. One suitable example of such material is RHINO LINING coating available from Rhino Linings Corporation.

Although not always required, the shape of the cushion body is, in certain aspects of the invention, cylindrical or substantially cylindrical, wherein the shape is, in latitudinal cross-section, e.g., a circular, semi-circular, oval, semi-oval or arcuate shape. The size of each cushion body can vary widely from one application to another, and is preferably selected to optimize the protection sought while permitting easy storage when the apparatus is not installed. Likewise, the number of cushion bodies employed may be one or more, if the particular application of the apparatus requires a multitude of cushion bodies to optimize the protection provided to the marine structure and/or watercraft.

The rigid support member component of apparatus of this invention can be a wide vary of material(s) structured to form a support for the mounting surface of the cushion body. Non-limiting examples of the rigid support member include a support frame or frame assembly, or a support panel or backboard, or a plurality of support panels or backboards. If using a backboard component as the rigid support member, the backboard is preferably at least one solid sheet of water-resistant or water-proof material (e.g., high density polymer such as polyurethane or the like), the sheet being shaped to optimize support of the mounting surface of the cushion body with which it is used.

The attachment means component of the apparatus of the invention may be comprised of one or more tension strap assemblies, chains, ropes, lines, cords or mechanical fasteners, or the like. As used herein, the term "strap" and any plural form thereof should be understood to include and encompass any flexible yet strong elongated material. Mechanical fasteners, e.g., nails, bolts or screws, or ropes may be suitable as the attachment means when the cushion body is an inflatable body employed during fair weather environments.

It should also be appreciated that the outer surfaces of the cushion body may be employed to convey messages to passersby, by having labels, signs or stitching placed thereon. For example, while fendering at a boat show or fishing tournament, as a medium for sponsor advertising and fendering at boat shows, fishing tournaments or other commercial/public activity, signage could be incorporated into or onto the outer surfaces of the cushion body to provide utility in addition to fendering. Boat or yacht brokers could likewise use the inflatable cushion bodies to both protect a vessel and communicate information similar to that provided with for-sale signage or the like.

The cushion body is preferably detachably attached to the rigid support member. This attachment may be accomplished in a number of ways using fasteners or other structural designs. In one embodiment in which the cushion body is a solid or semi-solid body and the rigid support member is a backboard, the cushion body is held to the backboard by polyurethane fabric that covers the outer circumference of the semi-solid body and is affixed into a receiving notch in the form of a dovetailed miter joint or groove running longitudinally on both planar surfaces proximate to the longitudinal end portions of the backboard. "Dovetail" grooves as referenced throughout this document and the appended claims in cross-section may take other forms other than that of a dovetail-type, as long as an opening of the groove is narrower compared to the rest of the groove width, so as to retain material disposed proximate to the floor of the groove. The longitudinal edges of the polyurethane fabric have a rope/cord sewn into a channel-forming flap in the material and extending from the semi-solid body. A length (e.g., Approx ¾ of an inch) of material is folded around the cord and then stitched. This boltrope detail can then be threaded into the groove at an end thereof to be retained in the groove along the entire length of the flap of material.

Turning now to the figures, FIGS. 1, 2, 3, 5 and 6, each or in combination, illustrate an apparatus 10 for detachable attachment to a portion of a marine structure 12. Marine structure 12 shown in FIGS. 1, 2, 4 and 6 is a floating dock. However, apparatus 10 may be temporarily attached to a broad range of marine structures within the spirit and scope of this invention. Such non-limiting examples include fixed and/or floating docks, piers, pilings, wharfs, offshore oil and gas structures, and the like. Apparatus 10 includes an inflatable body 14, which forms a mounting surface 16 and a watercraft-engaging surface 18 substantially opposing the mounting surface. Inflatable body 14 extends along a longitudinal axis Y thereby forming a partially cylindrical shape, wherein inflatable body terminates along its longitudinal axis in a first longitudinal end portion 20 and a second longitudinal end portion 22. In the alternative embodiment illustrated in FIG. 4, watercraft-engaging surface 18 is substantially arcuate and extends approximately two hundred and seventy degrees (270°) about longitudinal axis Y when inflatable body 14 is inflated.

Figure 4:
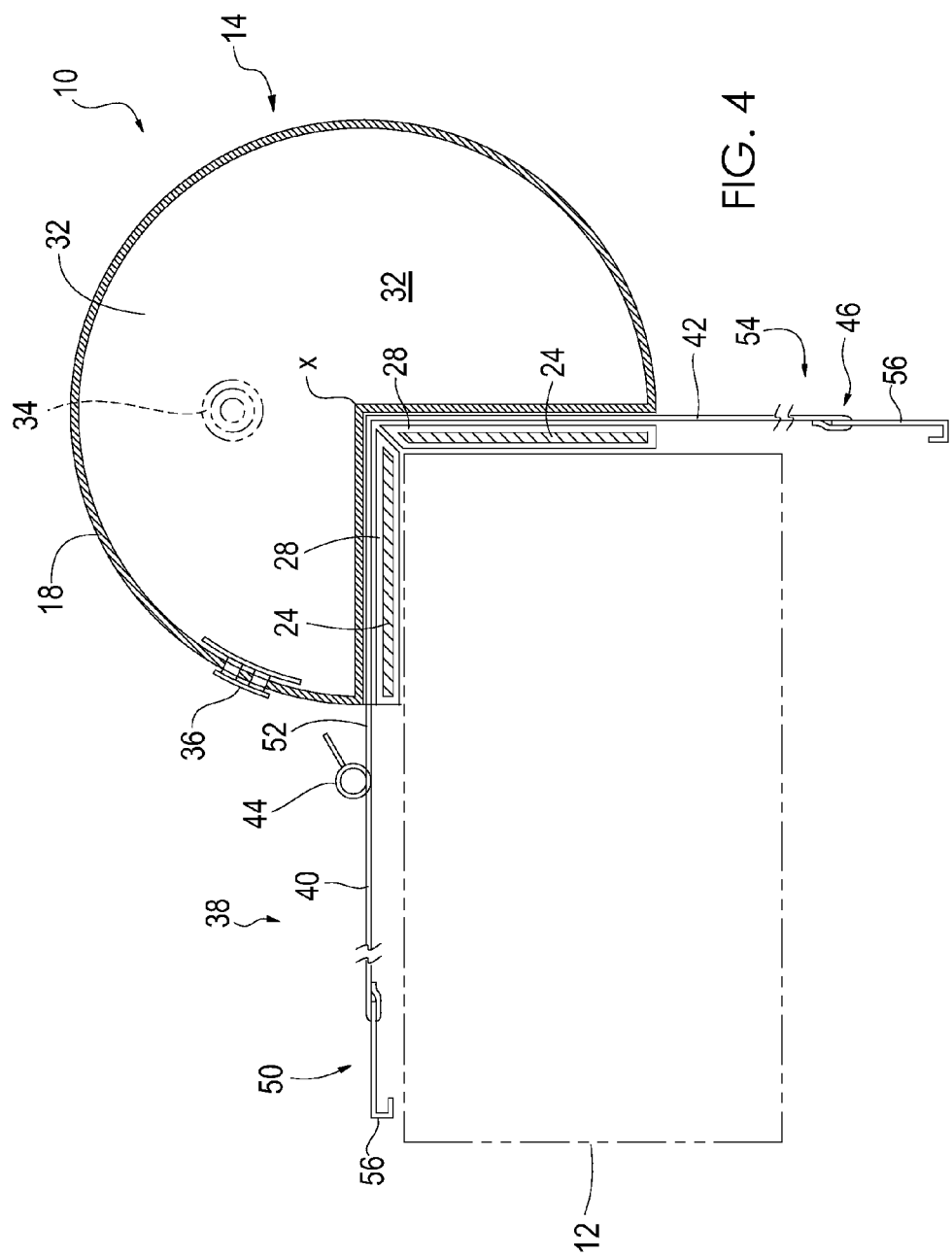
FIG. 4 is a cross-sectional view, taken along a similar imaginary vertical plane as that for FIG. 2, but illustrating another embodiment of the invention employing an inflatable body design formed from a single layer of nonporous material or fabric.
Figure 5:
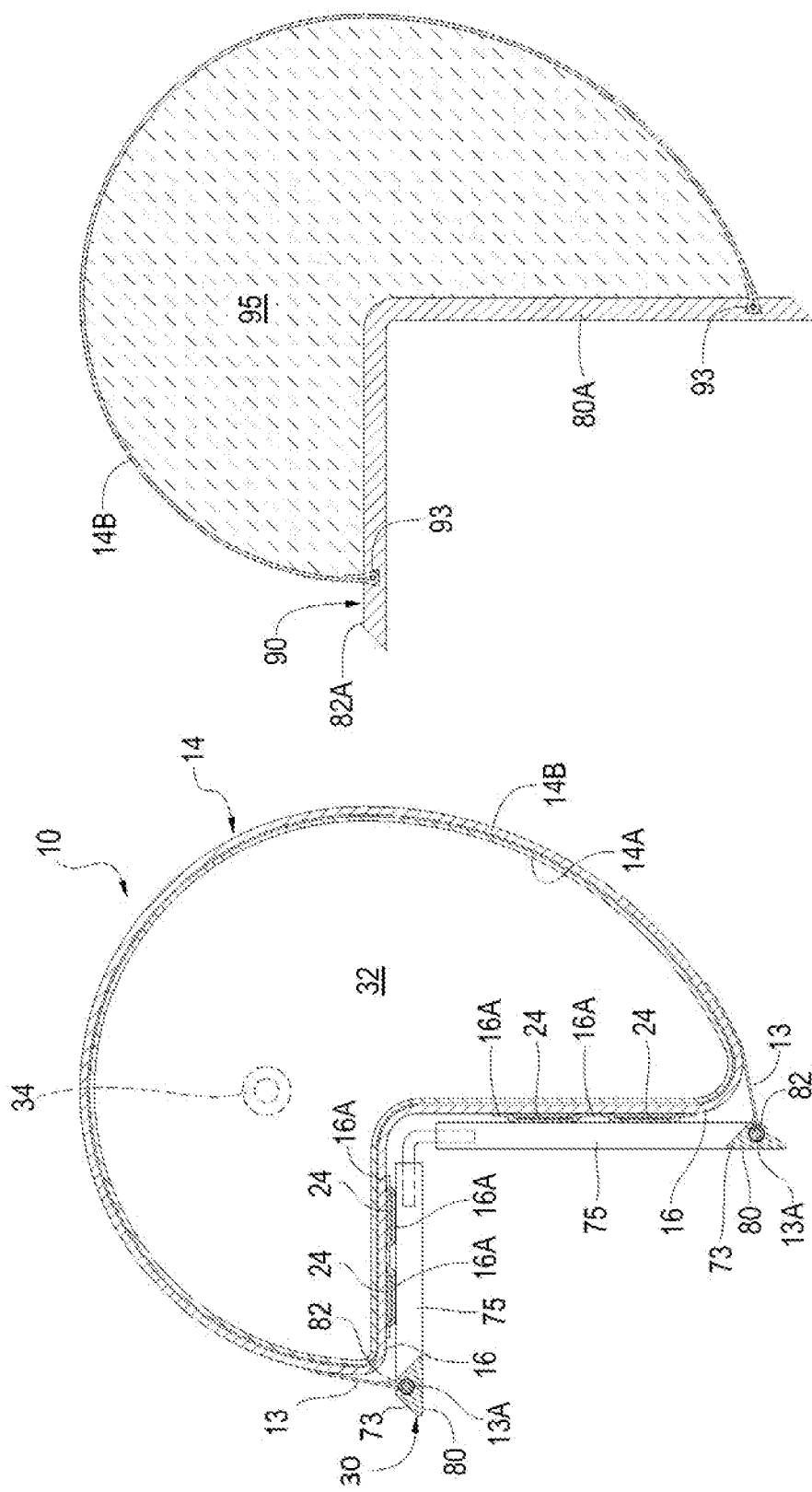
FIG. 5 is a magnified cross-sectional view of one of the inflatable bodies of FIGS. 1 and 2, wherein the inflatable body includes a mounting frame and at least one valve consistent with one embodiment of the invention.

In the embodiments illustrated in FIGS. 2, 4 and 5, mounting surface 16 defines a plurality of mounting surface channels 16A and includes therein a plurality of mounting surface support members 24, consisting of slats of resilient plastic material which add strength and resiliency to mounting surface 16 as it interfaces with a rigid support member 30 underneath the cushion body 14.

Figure 7:
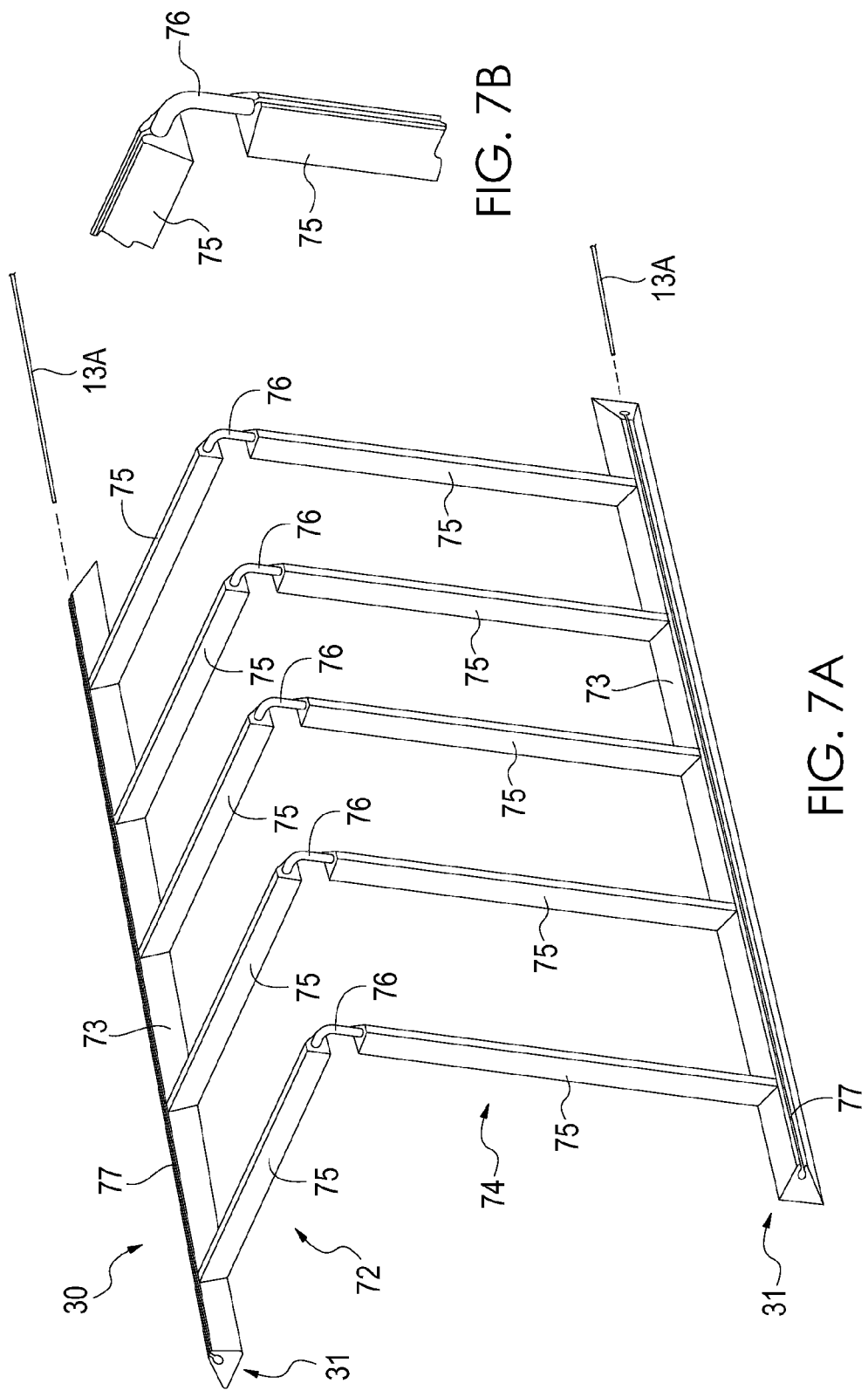
FIG. 7A is a perspective view of the extruded aluminum mounting frame, also illustrated in part in FIGS. 2 and 5, for use with an inflatable body in one embodiment of the invention.
FIG. 7B is a close-up perspective view of the right-angle stainless steel rod utilized to connect the two sections of extruded aluminum frame illustrated in FIG. 7A.
Figure 8:
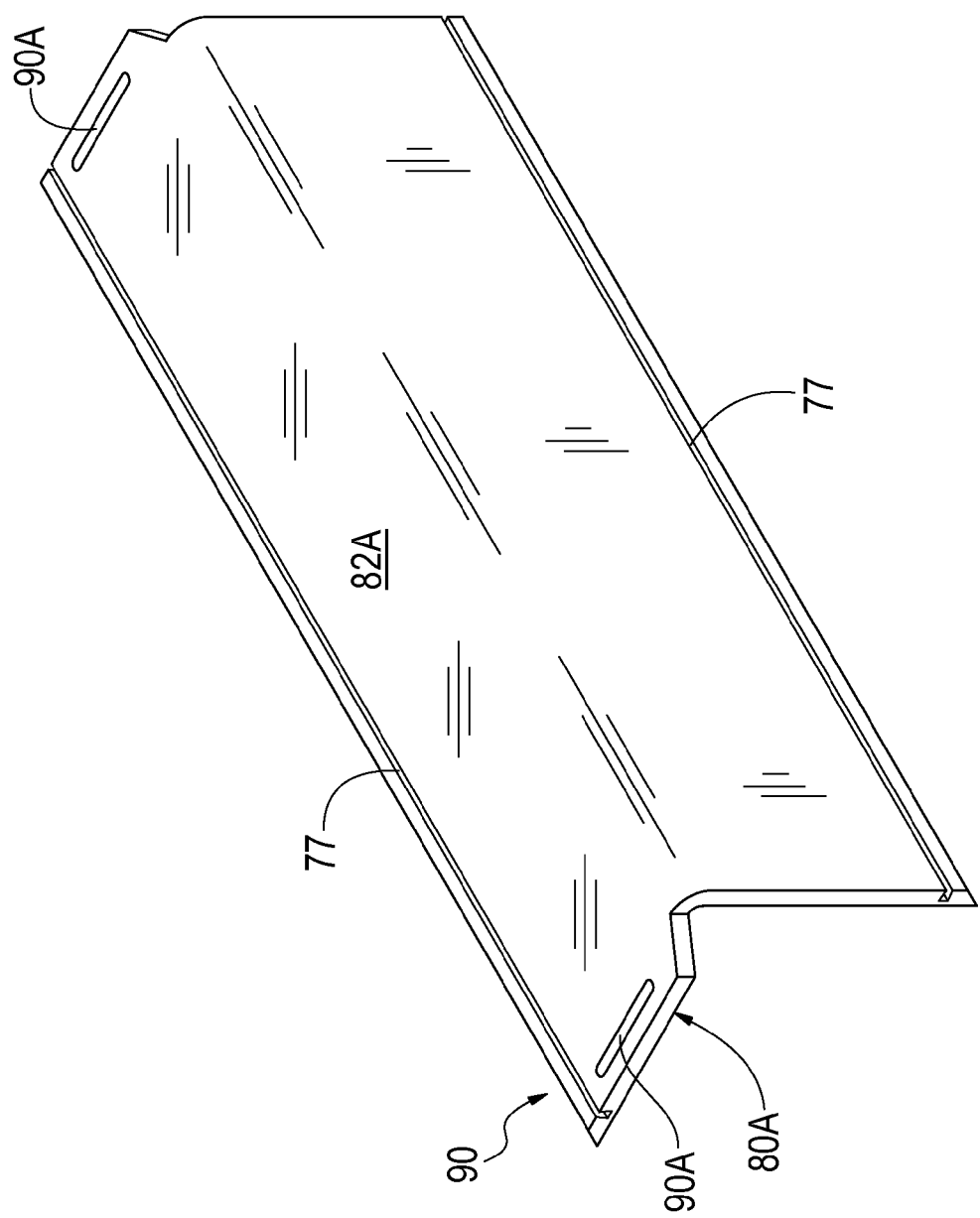
FIG. 8 is a perspective view of a sheet of foam board support employed to support a cushion body in accordance with another embodiment of the invention.

Rigid support member 30 may take different forms, one example being illustrated in FIGS. 2, 5, 7A and 7B, while another is illustrated in FIGS. 8 and 9. In the illustrated versions, the rigid support member 30 defines at least two elongate dovetailed grooves 77 on one or more faces of the rigid support member 30, the dovetailed grooves 77 extending the longitudinal length of the rigid support member 30 at opposing longitudinal side portions 31 of the rigid support member 30, each of the grooves 77 being sized and configured (i) to receive respective elongated, channel-forming flaps 13 extending from the cushion body 14, and (ii) retain a respective one of the flaps 13 when a respective elongated retention member 13A (as illustrated, in the form of rope or a dowel) is threaded through the respective one of the flaps 13 when it is disposed in its respective groove 77.

The example illustrated in FIGS. 2, 5, 7A and 7B is a frame assembly constructed from two frame panels 72 and 74, each being formed from an elongate frame member 73 joined together with two or more cross members 75. Each cross member 75 is configured at one end for attachment to the elongate frame member 73 and configured at its other end for detachable attachment to the other frame panel at a corresponding cross member 75 of the other frame panel, via a respective one of stainless steel right angle pins 76. Panels 72 and 74 are thus joined together by a plurality of pins 76, each pin 76 being inserted into an open end 75A of a central groove 75B in opposing cross members 75.

As can be seen from FIGS. 5 and 7A, the elongate frame members 73 and cross members 75 are triangular in cross-sectional shape, with a bottom face 80 and a groove-forming top face 82, each running the length of members 73 and 75, wherein each groove-forming top face 82 defines one of the dovetailed grooves 77 and 75B, respectively.

The other rigid support member example in FIGS. 8 and 9 is a polyurethane backboard 90 bent into a right angle and forming a groove-forming surface 82A and a bottom surface 80A. Surface 82A defines two dovetailed miter grooves 77. In one embodiment in which the cushion body is a solid or semi-solid body and the rigid support member is backboard 90, the cushion body is held to backboard 90 by polyurethane fabric 92 that covers the outer circumference of the semi-solid body and is affixed into a receiving notches in the form of dovetailed grooves 77 running longitudinally on surface 82A proximate to the longitudinal end portions of backboard 90. As seen in FIG. 8, backboard 90 further defines slotted openings 90A for attachment fasteners, to allow, for example, a single threaded fastener with tightening knob to be inserted through both ends of the backboard proximate openings 90A into a threaded sleeve (threaded sleeve is first counter-sunk into the dock via drill or screwdriver or both). The elongated openings 90A permit the backboard to move in a direction perpendicular to its longitudinal axis (also the edge of the dock in the illustrated embodiment) upon impact. By allowing the cushion body and its underlying support to move upon impact, this particular configuration can minimize the impact related force from being transferred into the fastener, and then into the dock through the fastener, thereby diminishing the chance that the fastener becomes dislodged and essentially creating a secondary shock absorbing characteristic to the apparatus. Other alternative materials may be contemplated to construct the backboard in the apparatus of the invention, provided the material provides sufficient rigidity and strength to provide for at least one planar surface and to allow the mounting surface to function according to its intended use and the practitioner's needs. Furthermore, the backboard can be utilized with cushion bodies which are, for example, either an inflatable body or a solid/semi-solid (e.g., foam) cushion body.

As noted by reference to FIG. 5, inflatable body 14 defines a chamber 32 sized and configured to be inflated with air or other fluid. Preferably, inflatable body is inflated with air from an air compressor source. However, any source capable of filling the inflatable body with fluid may be used. Optionally, chamber may be configured to be filled with a solid or gel-like substance capable of absorbing forces exerted on the inflatable body by impact with the watercraft. Inflatable body may be formed from marine fabric material, e.g., polyurethane, polyvinyl chloride, HYPALON® material by DuPont, or the like. Generally, the material should be rugged, nonporous (unless separate airtight internal bladder is present), and tear-resistant. Additionally, it should be a resilient material capable of being impacted and deformed and able to return to its pre-impact state. In an alternative design illustrated in particularly in FIG. 5, inflatable body 14 comprises an internal bladder 14A and an external cover layer 14B formed from a urethane-coated fabric.

Inflatable body may be filled or inflated to a predetermined pressure. When inflated or filled to a pressure, for example, within five percent of a maximum pressure rating for the inflatable body, the inflatable body will typically take a pre-designed shape. As illustrated in the drawings, the inflatable body will take a substantially cylindrical shape having an inverted tear-drop shape in cross-section with at least a portion of the craft-contacting surface being substantially arcuate in shape. Optionally, the inflatable body may be only partially inflated or filled. When the inflatable body is partially filled, the illustrated inflatable body may be generally arcuate in shape, but may form a non-arcuate shape in at least one portion of the inflatable body.

In the embodiment illustrated specifically in FIG. 4, inflatable body 14 provides for an inflation and air pressure management system through the inclusion of an infill valve 34 and a pressure release valve 36 incorporated in inflatable body 14. The infill or inflation valve provides for the use of a standard compressor, foot pump or vacuum to inflate the inflatable body to a desired pressure. The inflation valve may be any conventional inflation valve capable of allowing air or other fluid to enter the chamber. The pressure release valve allows the inflatable body, when inflated, to self regulate the internal air pressure within the chamber. In the event of a significant impact from an adjacent watercraft, whereby the internal pressure of the inflatable body becomes greater than the desired, predetermined pressure, the pressure release valve will open and release a sufficient volume of air such that the internal pressure falls below the maximum pressure thus avoiding the over pressurization and potential damage to the inflatable body. The pressure relief valve is an optional component in apparatus of this invention, and may be any commercially available valve capable of regulating internal pressure.

Apparatus of the invention further comprise attachment means for detachably attaching the inflatable body to the portion of the marine structure. One example of suitable attachment means is illustrated in FIGS. 1, 2, 4 and 6, wherein the attachment means comprises a plurality of releasable strap assemblies 38. Each releasable strap assembly 38 includes a first strap 40, a second strap 42, and a tension device 44 used in part to detachably attach inflatable body 14 to dock 12. First strap 42 further includes a first structure end portion 46 and a first tension device end portion 48, wherein the first structure end portion is sized and configured to attach to the portion of the dock 12. Second strap 42 includes a second structure end portion 50 and a second tension device end portion 52, wherein a portion of the second strap 42 is disposed within at least one of a plurality of apertures 28 (FIGS. 4 and 6) and the second structure end portion is sized and configured to attach to the portion of the dock 12.

Tension device 44, illustrated in FIGS. 2 and 4 as a ratchet or cam buckle, is coupled to the first tension device end portion 48 and the second tension device end portion 52, wherein the tension device is sized and configured to increase the tension in the first strap and/or second strap by adjusting the length of the first strap 40 and/or the second strap 42 when the first structure end portion 46 and the second structure end portion 50 are attached to the portion of the dock 12 thereby securing inflatable body 14 to the portion of the dock 12. The first strap and second strap may be formed from a webbing material made of woven polyester material. However, other suitable material may be used to form the first strap and second strap. Such nonlimiting examples include elastic cord, metal chain, rope, and the like. Additionally, when using a tension device, other conventional tension devices may be employed to provide tension to the first strap and/or the second strap.

As discussed above, each releasable strap assembly in the illustrated embodiment includes a first strap having a first structure end portion and a second strap having a second structure end portion, wherein both the first structure end portion and the second structure end portion are sized and configured to attach to the portion of the marine structure. As illustrated in FIGS. 2, 3, and 4, both first structure end portion 46 and second structure end portion 50 further include a subassembly 54 including a bracket 56 forming a "J" and a universal mount 58. Universal mount 58 is attached to the first strap 40 and second strap 42 and includes a plurality of male connectors 60 in the form of prongs sized and configured to be accepted by a plurality of female connectors 62 illustrated as apertures defined by a portion of the bracket 56 as illustrated in FIG. 3. The universal mount allows for the brackets to be interchangeable depending on the marine structure to which the inflatable body is being secured. Other brackets may form an "L" shape, an "S" shape, and the like and in fact other releasable fastening devices such as buckles or the like may be substituted for the brackets illustrated here.

In operation, at least a portion of the second strap is disposed within at least one of the plurality of channels defined by the mounting surface. The bracket is chosen by the practitioner based in part on the marine structure to which the inflatable body will be attached. The brackets are secured to a portion of the marine structure. The tension device, in cases where the tension device is a ratchet, is then ratcheted until the tension in the first strap and second strap is increased so that the brackets are firmly flush with the mounting surface and the inflatable body is securely, but temporarily attached to the marine structure.

Figure 6:
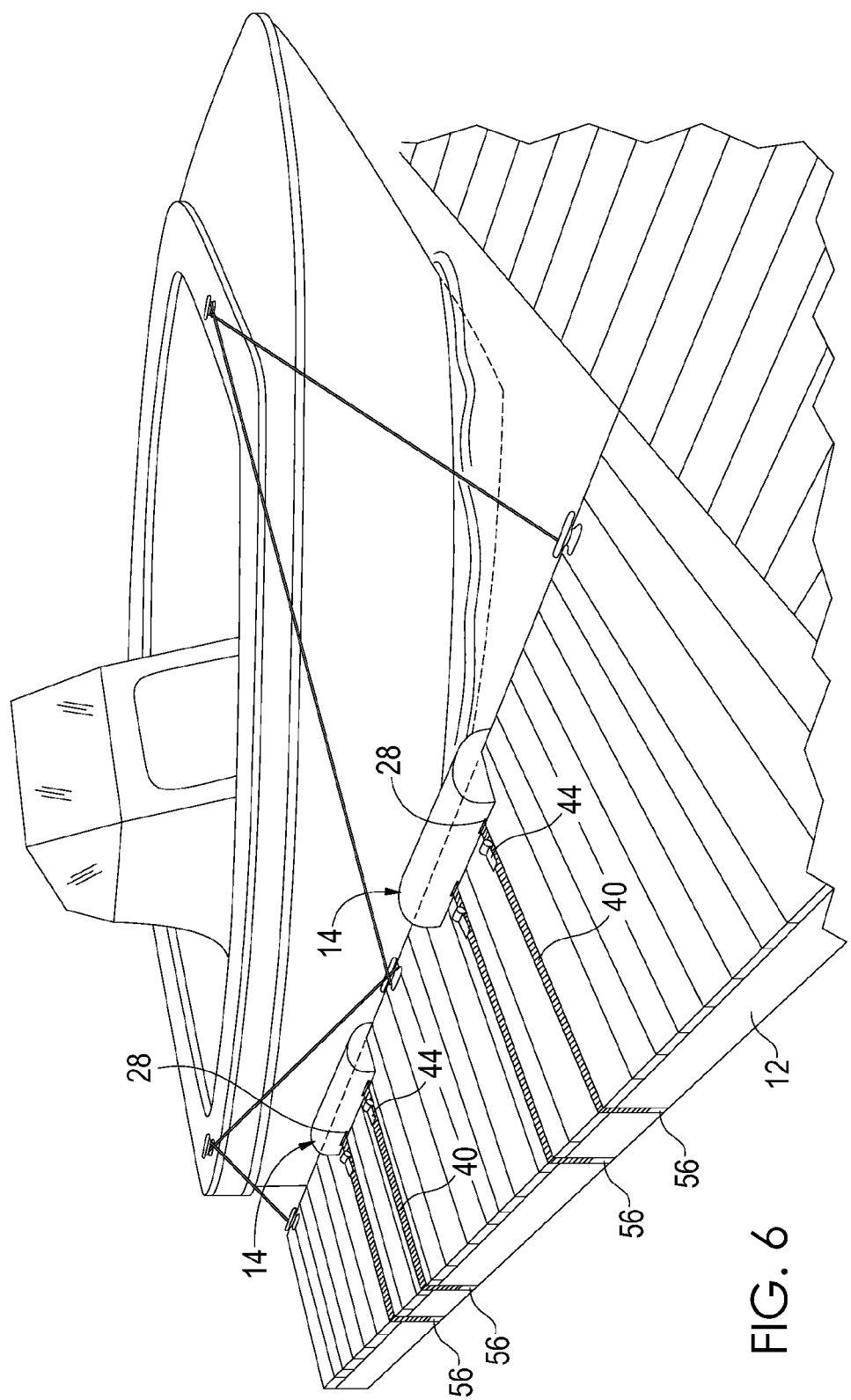
FIG. 6 is a perspective view of two cushion bodies in accordance with one embodiment of the invention, installed at a floating dock adjacent to a watercraft.

As illustrated in FIGS. 1 and 6, two releasable strap assemblies 38 are equally spaced along the longitudinal length of the inflatable body 14 or foam core body 95 of FIG. 9. Optionally, releasable strap assemblies may be unequally spaced along the longitudinal length of the inflatable body. The spacing of the releasable strap assemblies may differ depending on, for example, the dimensions of the inflatable body and the marine structures to which it is attached.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

Illustrative embodiments of the invention have been described here as they might be employed in the construction and use of an apparatus for detachable attachment to a portion of a marine structure and in practice of a method according to the invention. It should be appreciated that in the development of an actual embodiment, numerous implementation-specific decisions must be made to achieve the developers' specific goals, such as compliance with system-related, environmentrelated and business-related constraints, which will vary from one implementation to another. Moreover, while such a development effort might be burdensome, it nevertheless would be a routine undertaking for those of ordinary skill in the art having the benefit of this disclosure. Accordingly, this invention is susceptible to considerable variation within the spirit and scope of the appended claims.

The invention claimed is:

1. An apparatus for detachable attachment to a portion of a marine structure, the marine structure being selected from the group consisting of a fixed or floating dock, a pier, a piling, a wharf, and an offshore oil and gas structure, the apparatus comprising
   a cushion body forming a mounting surface and a watercraft-engaging surface substantially opposing the mounting surface, the cushion body comprising a channel-forming flap through which an elongated retention member extends;
   at least one rigid support member, the rigid support member defined by or configured for contact with the mounting surface of the cushion body and disposed, during use, between the cushion body and the portion of the marine structure, the rigid support member comprising an elongated groove; and
   attachment means for detachably attaching the cushion body to the portion of the marine structure,
wherein
   the cushion body, when attached to the portion of the marine structure, is sized and configured to prevent destructive contact between the marine structure and a watercraft when the watercraft-engaging surface is contacted by the watercraft; and
   the elongated groove is configured to receive and retain the elongated flap and elongated retention member, thereby securing the cushion body to the rigid support member.

2. The apparatus of claim 1 wherein the cushion body comprises an inflatable body having a substantially cylindrical shape such that its greatest longitudinal axis length is greater than its greatest latitudinal axis length.

3. The apparatus of claim 2 wherein the inflatable body comprises an internal bladder and an external cover layer.

4. The apparatus of claim 2 further comprising an inflation and air pressure management system comprising an infill valve, the infill valve coupled to the inflatable body and providing fluid communication between an internal fluid in the inflatable body and the external atmosphere.

5. The apparatus of claim 4 further comprising a pressure relief valve, the pressure relief valve coupled to the inflatable body and providing fluid communication between an internal fluid in the inflatable body and the external atmosphere.

6. The apparatus of claim 1 wherein at least a portion of the watercraft-engaging surface is substantially cylindrical in shape.

7. The apparatus of claim 6 wherein longitudinal axes of the watercraft-engaging surface and the mounting surface are substantially parallel to each other.

8. The apparatus of claim 1 wherein the cushion body is formed from a solid or semi-solid resilient material comprising a foam.

9. The apparatus of claim 8 wherein the foam comprises ethylene-vinyl acetate.

* * * * *